United States Patent
Paik et al.

(10) Patent No.: US 11,403,484 B2
(45) Date of Patent: Aug. 2, 2022

(54) ELECTRONIC DEVICE FOR RESOURCE-EFFICIENT OBJECT RECOGNITION USING ARTIFICIAL NEURAL NETWORK WITH LONG-RANGE CONNECTION AND OPERATING METHOD THEREOF

(71) Applicant: Korea Advanced Institute Of Science And Technology, Daejeon (KR)

(72) Inventors: Se-Bum Paik, Daejeon (KR); Youngjin Park, Daejeon (KR); Seungdae Baek, Daejeon (KR)

(73) Assignee: Korea Advanced Institute Of Science And Technology, Daejeon (KR)

( * ) Notice: Subject to any disclaimer, the term of this patent is extended or adjusted under 35 U.S.C. 154(b) by 101 days.

(21) Appl. No.: 17/002,432

(22) Filed: Aug. 25, 2020

(65) Prior Publication Data
US 2021/0295097 A1   Sep. 23, 2021

(30) Foreign Application Priority Data
Mar. 17, 2020 (KR) .......... 10-2020-0032411

(51) Int. Cl.
G06K 9/62      (2022.01)
G06N 3/04      (2006.01)
G06V 10/94     (2022.01)

(52) U.S. Cl.
CPC ........ *G06K 9/6256* (2013.01); *G06K 9/6218* (2013.01); *G06N 3/04* (2013.01); *G06V 10/95* (2022.01)

(58) Field of Classification Search
CPC ........... G06N 20/00; G06N 3/08; G06N 3/082
See application file for complete search history.

(56) References Cited

U.S. PATENT DOCUMENTS 11,113,532 B2    9/2021  Kim
2016/0247064 A1*  8/2016  Yoo .................. G06N 3/0445

FOREIGN PATENT DOCUMENTS

KR    20190094133 A    8/2019

OTHER PUBLICATIONS

J. L. McKinstry and C. C. Guest, "Long range connections in primary visual cortex: a large scale model applied to edge detection in gray-scale images," IJCNN'01. International Joint Conference on Neural Networks. Proceedings (Cat. No. 01CH37222), 2001, pp. 843-847 vol. 2, doi: 10.1109/IJCNN.2001.939469. (Year: 2001).*
McKinstry, J. L. & Guest, C. C., "Long Range Connections in Primary Visual Cortex: A Large Scale Model Applied to Edge Detection in Gray-Scale Images," IEEE 2001, pp. 843-847.

* cited by examiner

*Primary Examiner* — Ross Varndell
(74) *Attorney, Agent, or Firm* — Nixon Peabody LLP

(57) ABSTRACT

Various example embodiments relate to an electronic device for resource-efficient object recognition using an artificial neural network with long-range horizontal connections and an operating method thereof, and the artificial neural network is configured to recognize an object from an image, be composed of a plurality of neurons, and include at least one hidden layer including at least one long-range horizontal connection connecting any two of the neurons with a length exceeding a preset distance, and at least one local connection connecting any two of the neurons with a length below a preset distance.

14 Claims, 10 Drawing Sheets

3 layers  3 layers + LRC  5 layers

ELECTRONIC DEVICE FOR RESOURCE-EFFICIENT OBJECT RECOGNITION USING ARTIFICIAL NEURAL NETWORK WITH LONG-RANGE CONNECTION AND OPERATING METHOD THEREOF

This application claims the priority benefit of Korean Patent Application No. 10-2020-0032411, filed on Mar. 17, 2020, Korean Intellectual Property Office, the disclosure of which is incorporated herein by reference.

BACKGROUND

1. Field of the Invention

The following example embodiments relate to an electronic device for resource-efficient object recognition using an artificial neural network with long-range horizontal connection and an operating method thereof.

2. Description of Related Art

The ability of an artificial neural network to recognize an object from an image already reached the human level. However, the artificial neural network requires a deep structure consisting of a much greater number of layers than an animal's visual cortex structure. For example, the visual cortex structure of the animal consists of dozens of layers to reach from the retina first receiving visual information to the inferior temporal cortex recognizing an object. In contrast, the artificial neural network has a deep structure composed of more than 150 layers. Since such deep structure of the artificial neural network requires a remarkably large amount of calculation and high energy consumption, there is a problem that connection-efficiency is low compared to performance when compared with the animal's visual cortex structure.

SUMMARY

Embodiments of the inventive concept may provide an electronic device capable of recognizing an object from an image by using an artificial neural network with improved connection-efficiency compared to performance and an operating method thereof.

Embodiments of the inventive concept may provide an electronic device capable of securing an object recognition performance from an image at a desirable level by using an artificial neural network composed of a small number of layers and an operating method thereof.

Embodiments of the inventive concept may provide an electronic device capable of recognizing an object from an image by using an artificial neural network that may operate similar to an animal's visual cortex structure and an operating method thereof.

Various example embodiments provide an electronic device for resource-efficient object recognition using an artificial neural network with long-range horizontal connection and an operating method thereof.

An electronic device according to various example embodiments may include a memory, and a processor configured to connect with the memory, execute at least one instruction stored in the memory, and have an artificial neural network for recognizing at least one object from an image, and the artificial neural network may be configured to recognize the object from the image, be composed of a plurality of neurons, and comprise at least one hidden layer comprising at least one long-range horizontal connection connecting any two of the neurons with a length exceeding a preset distance.

An operating method of an electronic device according to various example embodiments may include inputting an image, recognizing at least one object from the image by using an artificial neural network, and identifying the object, and the artificial neural network is configured to recognize the object from the image, be composed of a plurality of neurons, and comprise at least one hidden layer comprising at least one long-range horizontal connection connecting any two of the neurons with a length exceeding a preset distance.

A non-transitory computer-readable storage medium according to various example embodiments may store a computer program, and the computer program may comprise inputting an image, recognizing at least one object from the image by using an artificial neural network, and identifying the object, and the artificial neural network is configured to recognize the object from the image, be composed of a plurality of neurons, and comprise at least one hidden layer comprising at least one long-range horizontal connection connecting any two of the neurons with a length exceeding a preset distance.

According to various example embodiments, an artificial neural network of an electronic device may operate resource-efficiently compared to performance by using long-range horizontal connection. At this time, the artificial neural network may secure good performance with a small number of connections. Furthermore, the artificial neural network may secure good performance with a small number of layers. Through this, the artificial neural network may maintain an object recognition performance in an image at a desirable level with little resources. In other words, amount of calculation and energy consumption required in recognizing an object from an image in the artificial neural network may be remarkably reduced. Therefore, the artificial neural network may operate similar to an animal's visual cortex structure, and recognize an object from an image.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, some example embodiments will be described in detail with reference to the accompanying drawings.

Figure 1:
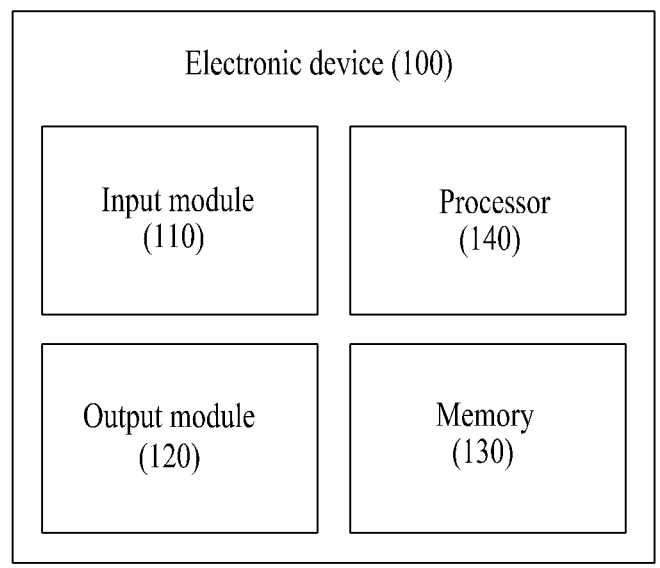
FIG. 1 is a drawing illustrating an electronic device according to various example embodiments.
Figure 2:
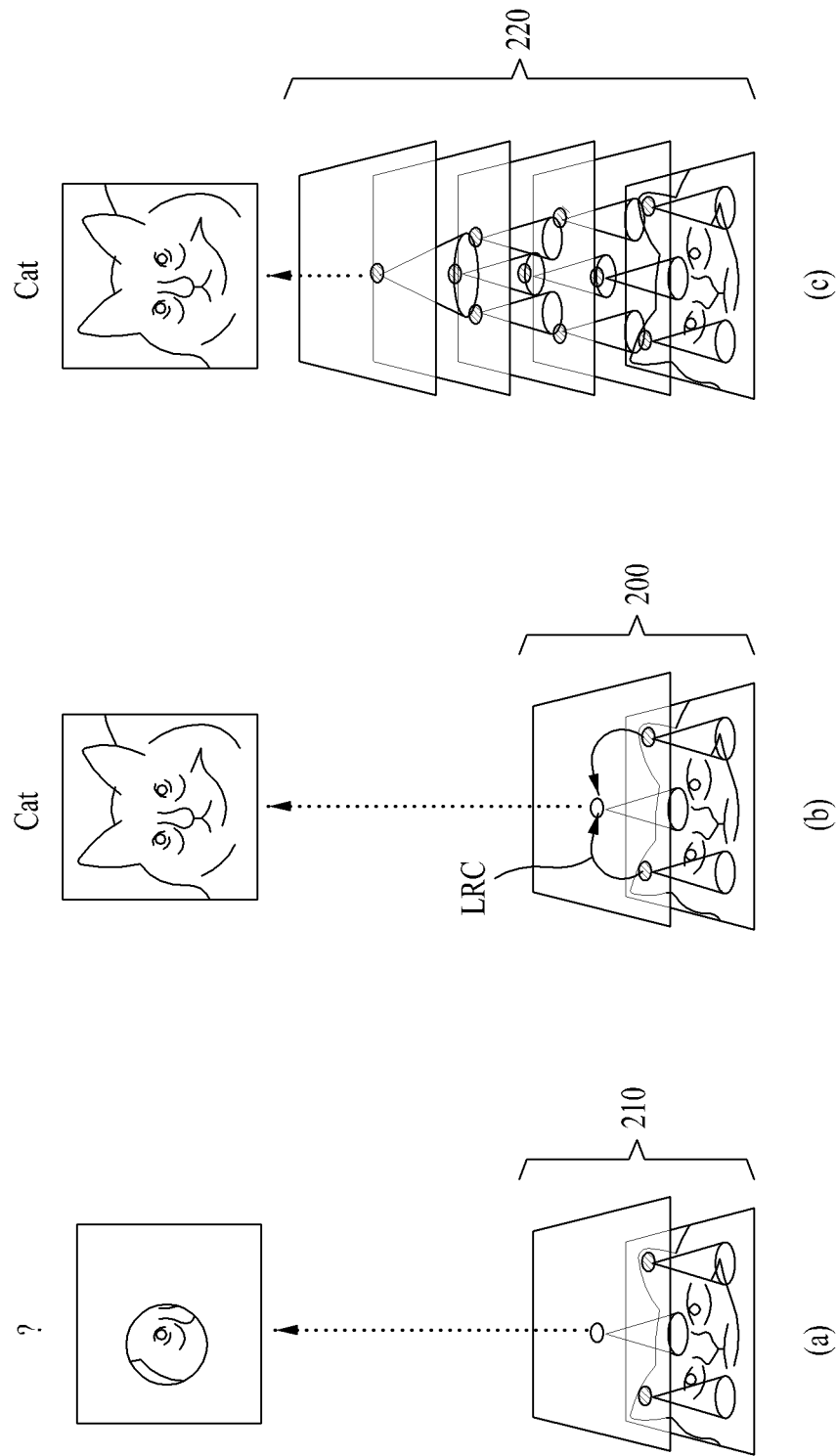
FIG. 2 is a drawing for describing operation features of an electronic device according to various example embodiments.

FIG. 1 is a drawing illustrating an electronic device 100 according to various example embodiments. FIG. 2 is a drawing for describing operation features of the electronic device 100 according to various example embodiments.

Referring to FIG. 1, the electronic device 100 may include at least one of an input module 110, an output module 120, a memory 130 or a processor 140. In some embodiments, at least one of the components of the electronic device 100 may be omitted, and at least another one component may be added. In some embodiments, at least two of the components of the electronic device 100 may be implemented into one integrated circuit. For example, the electronic device 100 may include at least one of a smartphone, a mobile phone, a navigation, a computer, a laptop, a terminal for digital broadcasting, a PDA (Personal Digital Assistants), a PMP (Portable Multimedia Player), a tablet PC, a game console, a wearable device, an IoT (Internet of Things) device, or a robot.

The input module 110 may input a signal to be used for at least one component of the electronic device 100. The input module 110 may include at least one of an input device configured for a user to directly input a signal to the electronic device 100, a camera device configured to photograph an external image of the electronic device 100, or a receiving device configured to receive a signal from an external device. For example, the input device may include at least one of a microphone, a mouse or a keyboard. In some embodiments, the input device may include at least one of a touch circuitry set to sense touch or a sensor circuitry set to measure force generated by touch. For example, the camera device may include at least one of a lens, at least one image sensor, an image signal processor or a flash.

The output module 120 may output a signal of the electronic device 100. The output module 120 may include at least one of a display device configured to visually display a signal, an audio device configured to output a signal in sound, or a transmitting device configured to transmit a signal to an external device. For example, the display device may include at least one of a display, a hologram device, or a projector. As an example, the display device may be assembled with at least one of the touch circuitry or sensor circuitry of the input device, and implemented in a touch screen. The audio device may include at least one of a speaker or a receiver.

According to one example embodiment, the receiving device and the transmitting device may be implemented in a communication module. The communication module may perform communication with an external device in the electronic device 100. The communication module may establish a channel between the electronic device 100 and the external device, and through the channel, perform communication with the external device. Here, the external device may include at least one of a satellite, a base station, a server, or another electronic device. The communication module may include at least one of a wire communication module or a wireless communication module. The wire communication module may connect to the external device with wire, and communicate over the wire. The wireless communication module may include at least one of a near field communication module or a long distance communication module. The near field communication module may communicate with the external device with a near field communication method. For example, the near field communication method may include at least one of Bluetooth, WiFi direct, or IrDA (Infrared Data Association). The long distance communication module may communicate with the external device with a long distance communication method. Here, the long distance communication module may communicate with the external device through a network. For example, the network may include at least one of a cellular network, the Internet, or a computer network such as LAN (local area network) or WAN (wide area network).

The memory 130 may store various data used by at least one component of the electronic device 100. For example, the memory 130 may include at least one of volatile memory or nonvolatile memory. Data may include at least one program and input data or output data related thereto. The program may be stored in the memory 130 as software including at least one instruction, and include e.g., at least one of an operating system, middleware or an application.

The processor 140 may control at least one component of the electronic device 100 by executing the program of the memory 130. Through this, the processor 140 may perform a data process or operation. At this time, the processor 140 may execute the instruction stored in the memory 130. In addition, the processor 140 may include artificial neural networks 200, 210, 220 for recognizing at least one object from an image. According to various example embodiments, the artificial neural network 200 may include at least one long-range horizontal connection (LRC) (global connection).

Each artificial neural network 200, 210, 220 may be composed of a plurality of layers as shown in FIG. 2. Through this, the depth of each artificial neural network 200, 210, 220 may be defined according to the number of layers. As shown in (a) of FIG. 2, if the depth of the artificial neural network 210 is shallow, the resource consumption for the object recognition from the image may be small, but the object recognition performance from the image may be low. Meanwhile, as shown in (c) of FIG. 2, if the depth of the artificial neural network 220 is deep, the object recognition performance may be high, but the resource consumption for the object recognition from the image may be large. According to various example embodiments, as the artificial neural network 200 includes at least one LRC, as shown in (b) of FIG. 2, even if the depth of the artificial neural network 200 is shallow, the object recognition performance from the image may be high. In other words, in the artificial neural network 200, the object recognition performance from the image may be high while the resource consumption for the object recognition from the image is small.

Figure 3:
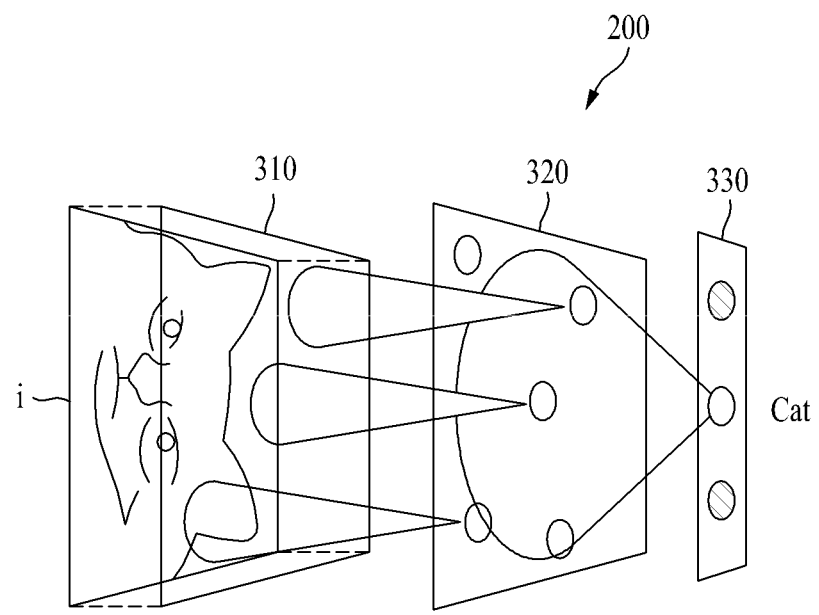
FIG. 3 is a drawing illustrating an artificial neural network of an electronic device according to various example embodiments.
Figure 4:
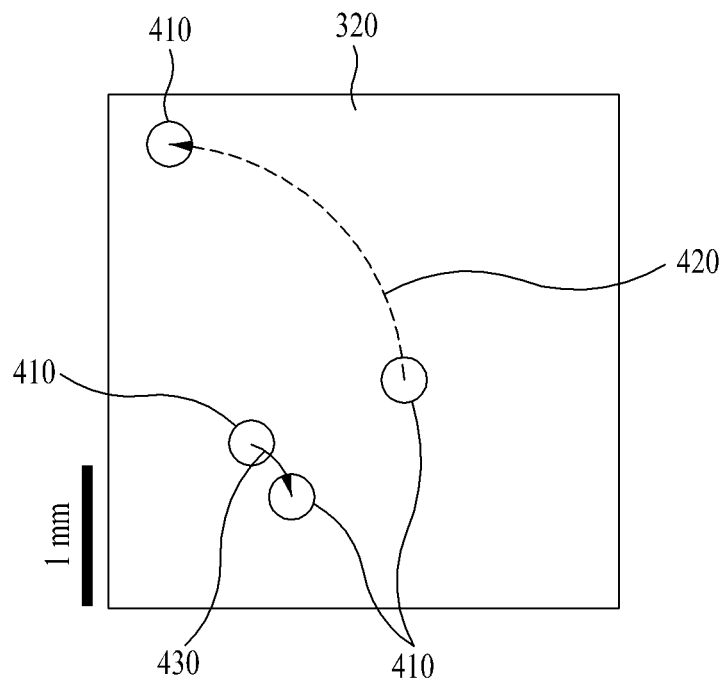
FIG. 4 is a drawing illustrating a hidden layer of FIG. 3.
Figure 5A:
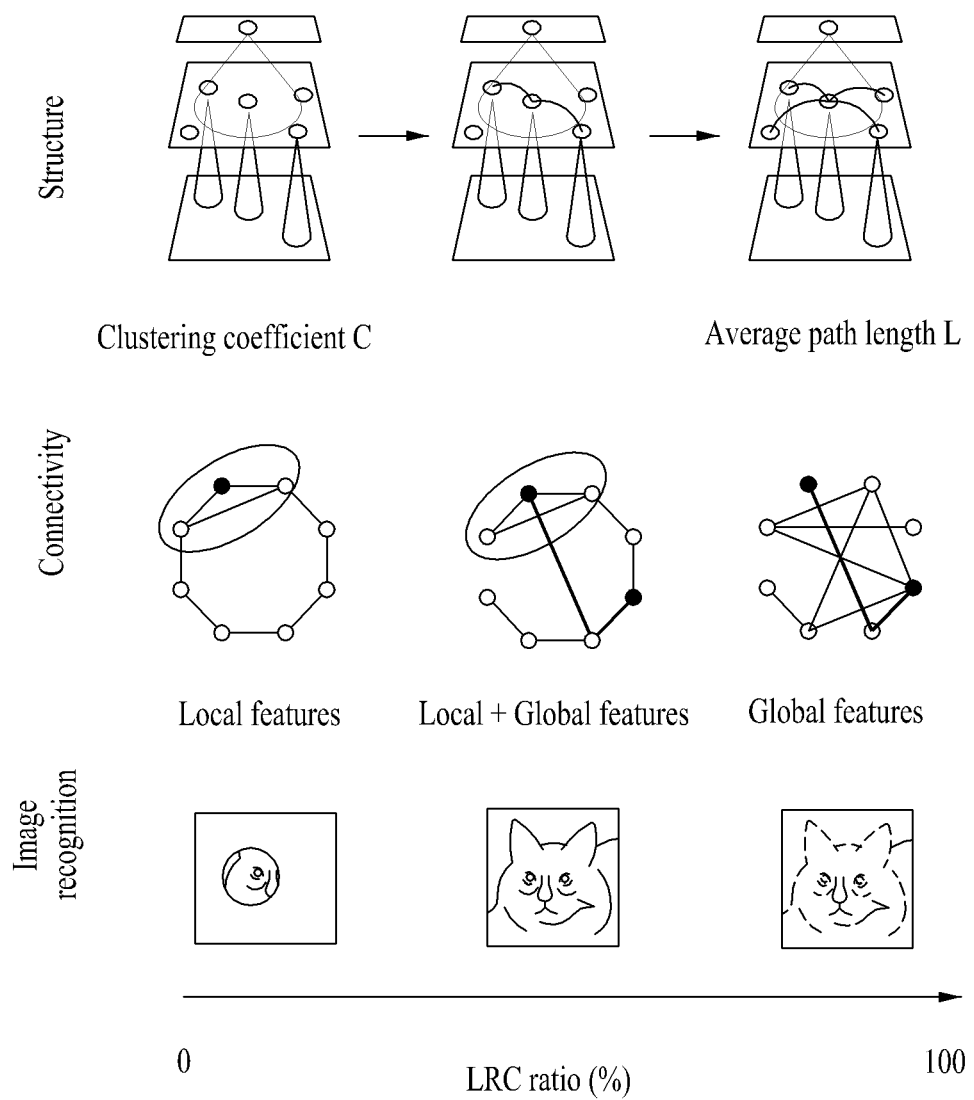
FIGS. 5A and 5B are drawings for describing ratio of horizontal connections on the hidden layer of FIG. 3.
Figure 5B:
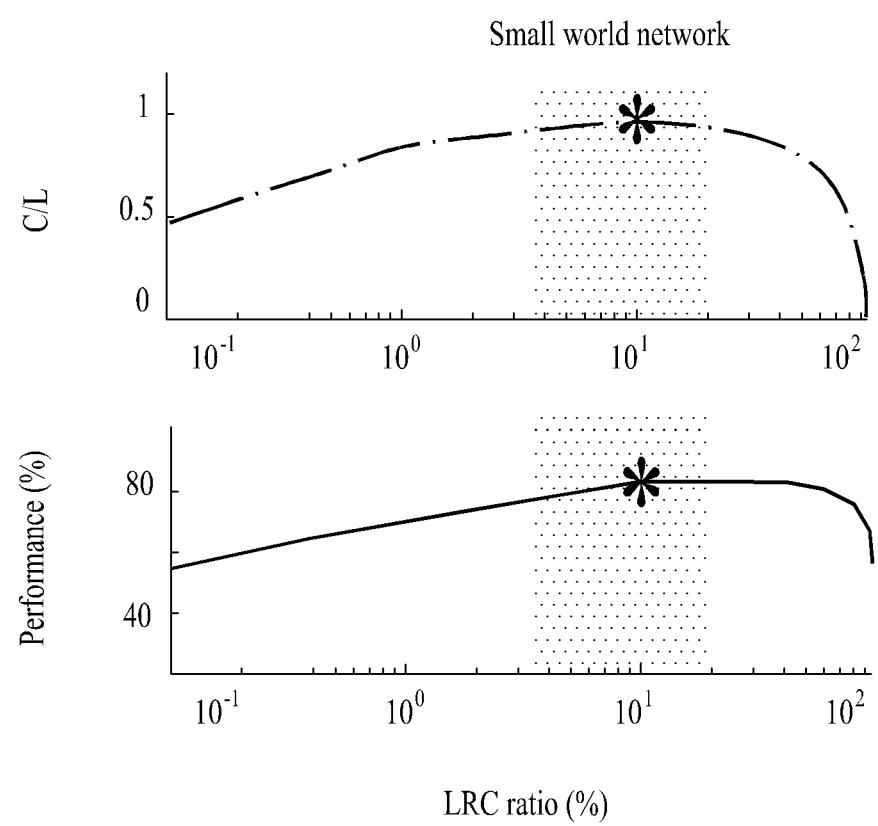

FIG. 3 is a drawing illustrating the artificial neural network 200 of the electronic device 100 according to various example embodiments. FIG. 4 is a drawing illustrating a hidden layer 320 of FIG. 3. FIGS. 5A and 5B are drawings for describing ratio of horizontal connections 420, 430 on the hidden layer 320 of FIG. 3.

Referring to FIG. 3, the artificial neural network 200 may include an input layer 310, at least one hidden layer 320, and an output layer 330. At this time, in the input layer 310, the hidden layer 320, and the output layer 330, a plurality of neurons may be arranged. In addition, the input layer 310 and the hidden layer 320, and the hidden layer 320 and the output layer 330 may be connected, respectively, based on a feedforward network structure. For example, in the artificial neural network 200, the connectivity between the input layer 310 and the hidden layer 320, and between the hidden layer 320 and the output layer 330 may be defined as the below [Equation 1].

$$h = \text{ReLU}(W_0 x + W_{Lat} W_0 x + b_0)$$

$$y = \text{softmax}(W_1 h + b_1) \qquad \text{[Equation 1]}$$

Here, the h indicates an output value of the hidden layer 320, e.g., it is derived by an activation function such as a rectified linear unit (ReLU), the $W_0$ indicates weight for the connectivity between the input layer 310 and the hidden layer 320, the x indicates a pixel value of an image i, the $W_{Lat}$ indicates weight for the connectivity in the hidden layer 320, and the $b_0$ indicates bias or tendency for the hidden layer 320. Furthermore, the y indicates a final output value of the output layer 330, e.g., it is derived by an activation function such as softmax, the $W_1$ indicates weight for the connectivity between the hidden layer 320 and the output layer 330, and the $b_1$ indicates bias or tendency for the output layer 330.

The input layer 310 may be configured to input the image i. The input layer 310 may input the image i to the hidden layer 320. Here, the image i may include at least one object, e.g., a cat.

The hidden layer 320 may be configured to recognize the object from the image i. At this time, the hidden layer 320 may include a plurality of neurons 410 and a plurality of horizontal connections 420, 430, as shown in FIG. 4. The neurons 410 may process information for the image i. The horizontal connections 420, 430 may connect the neurons 410 in the hidden layer 320. Also, the horizontal connections 420, 430 may include at least one LRC 420 and at least one local connection (short-range horizontal connection) 430. Each LRC 420 may connect any two of the neurons 410 with a length exceeding a preset distance. For example, the LRC 420 may have a length exceeding 1 mm. Each local connection 430 may connect any two of the neurons 410 with a length below a preset distance. For example, the local connection 430 may have a length below 0.5 mm. The number of the LRC 420 and the number of the local connection 430 may be determined by a preset ratio. In other words, for the total number of the LRC 420 and the local connection 430, the number of the LRC 420 and the number of the local connection 430 may be determined by the preset ratio.

At this time, as shown in FIG. 5A, according to the ratio of the number of the LRC 420 for the total number of the LRC 420 and the local connection 430, i.e., the ratio for the LRC 420, a clustering coefficient C of the neurons 410 on the hidden layer 320 and an average path length L of the horizontal connections 420, 430 between the neurons 410 of the artificial neural network 200 may be determined. As the ratio for the LRC 420 is lower, the clustering coefficient C on the hidden layer 320 may be high and the average path length L may be short. Here, the hidden layer 320 indicates local features, and the object recognition performance in the image i may be low. Meanwhile, as the ratio for the LRC 420 is higher, the clustering coefficient C on the hidden layer 320 may be low and the average path length L may be long. Here, the hidden layer 320 indicates global features, and the object recognition performance in the image i may be low. Therefore, by indicating the local features and the global features together by the hidden layer 320, the ratio for the LRC 420 should be set in order to secure the object recognition performance in the image i at a desirable level.

According to one example embodiment, as shown in FIG. 5B, the ratio for the LRC 420 may be set in order that the artificial neural network 200 is implemented as a small world network based on the clustering coefficient C and the average path length L on the hidden layer 320. For example, the clustering coefficient C on the hidden layer 320 may be defined as the below [Equation 2]. For example, the average path length L on the hidden layer 320 may be defined as the below [Equation 4]. The small world network may be defined as the below [Equation 5] based on the clustering coefficient C and the average path length L on the hidden layer 320. Through this, the ratio for the LRCs 420 may be above 5% and below 15%. Meanwhile, the ratio of the number of the LRC 420 for the total number of the LRC 420 and the local connection 430, i.e., the ratio for the local connection 430 may be above 85% and below 95%. In this case, the object recognition performance from the image i in the hidden layer 320 may be the highest.

$$C = \log\left(\frac{1}{N_{hidden} \sum_j c_j}\right) \qquad \text{[Equation 2]}$$

Here, the $N_{hidden}$ indicates the number of the neurons 410 on the hidden layer 320, the $c_j$ indicates the local clustering coefficient of the j neuron 410 and it may be defined as the below [Equation 3]

$$c_j = \frac{1}{N_{neighbor,j}}\left(\sum_i \frac{1}{d_{ii'}} + \sum_j \frac{1}{d_{j'j''}}\right) \qquad \text{[Equation 3]}$$

Here, the $N_{neighbor,j}$ indicates the number of the neurons 410 connected with the j-th neuron 410 of the hidden layer 320, the $d_{ii'}$ indicates the distance between the i-th neuron and i'-th neuron on the input layer 310, and the $d_{jj'}$ indicates the distance between the j-th neuron 410 and j'-th neuron 410 on the hidden layer 320.

$$L = \frac{1}{N_{input}(N_{input}-1)}\sum_{i \neq i'} l_{ii'} \qquad \text{[Equation 4]}$$

Here, $N_{input}$ indicates the number of the neurons on the input layer 310, the $l_{ii'}$ indicates the shortest path between the i-th neuron and the i'-th neuron on the input layer 310.

$$SW = \frac{C - C_{rand}}{C_{regular} - C_{rand}} \times \frac{L_{regular} - L_{rand}}{L - L_{rand}} \qquad \text{[Equation 5]}$$

Here, the $C_{rand}$ and $L_{rand}$ indicates the clustering coefficient and the average path length of the artificial neural network having randomly connected horizontal connection, and $C_{regular}$ and $L_{regular}$ may indicate the clustering coefficient and the average path length of the artificial neural network having only feedforward connection.

The output layer 330 may be configured to identify the object included in the image i. The output layer 330 may identify the object of the image i from the hidden layer 320. Here, the object of the image i, e.g., the cat may be identified.

FIGS. 6A, 6B, 7A, and 7B are drawings for describing operation effects of the artificial neural network 200 in the electronic device 100 according to various example embodiments.

Figure 6A:
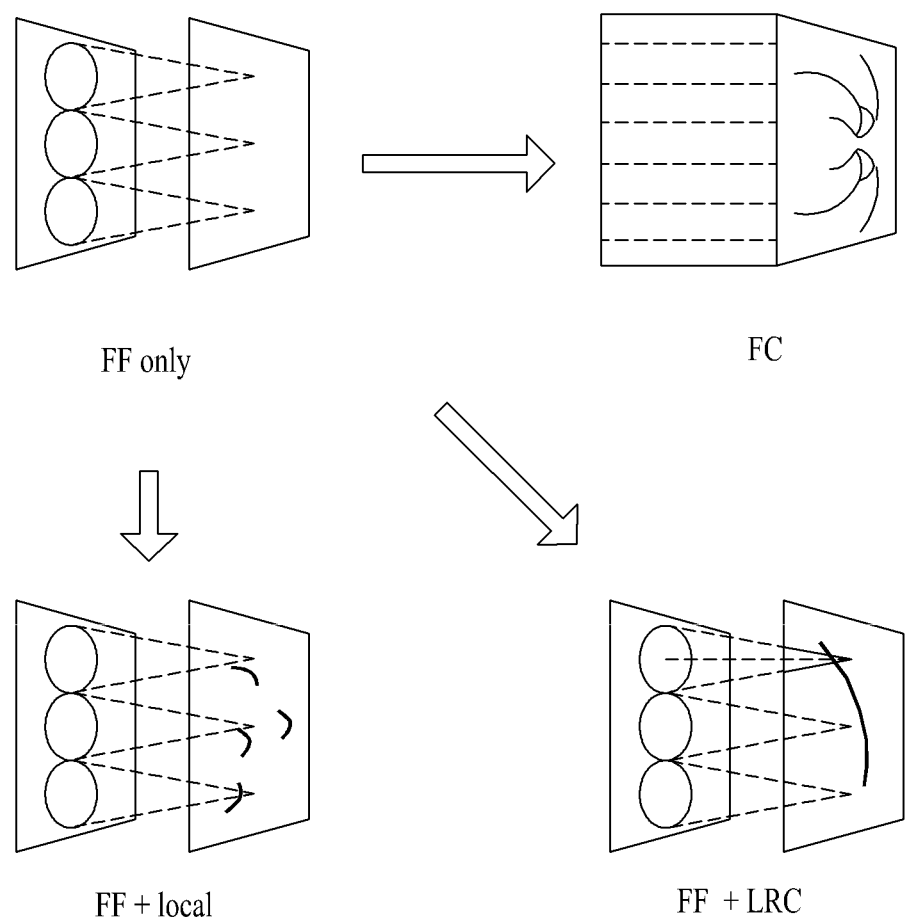
FIGS. 6A, 6B, 7A, and 7B are drawings for describing operation effects of an artificial neural network in an electronic device according to various example embodiments.
Figure 6B:
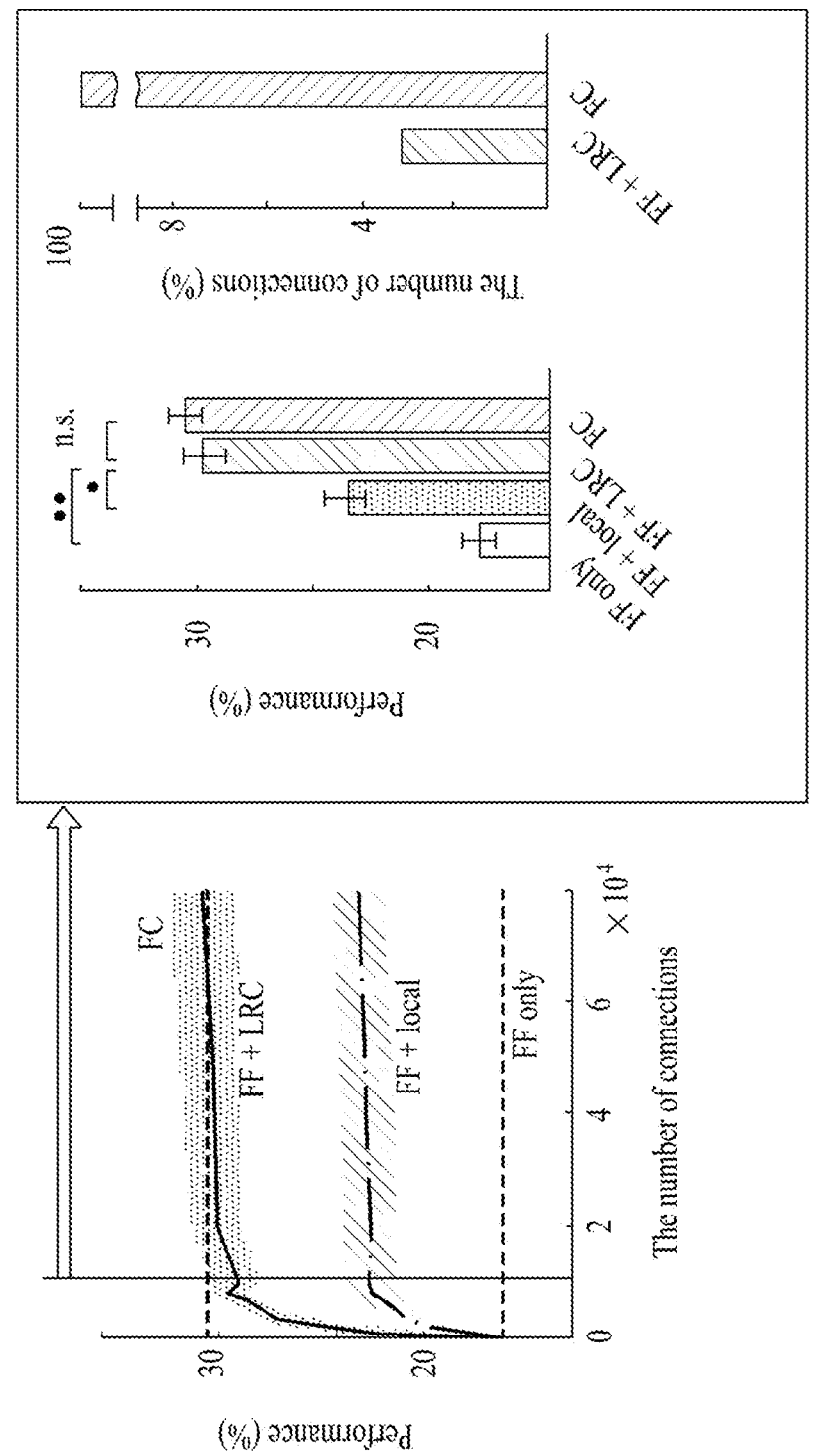

Referring to FIGS. 6A and 6B, performances of an artificial neural network having only feedforward connection (FF only), an artificial neural network having feedforward connection and local connection (FF+local), and an artificial neural network having feedforward connection and LRC (FF+LRC), and a full-connected artificial neural network (FC) may be compared. Since the artificial neural network having only feedforward connection (FF only) has no horizontal connections, the number of connections may be 0. Also, the performance of the artificial neural network having feedforward connection and local connection (FF+local) is superior to the performance of the artificial neural network having only feedforward connection (FF only), but the performance of the artificial neural network having feedforward connection and the LRC (FF+LRC) may be superior to the performance of the artificial neural network having feedforward connection and local connection (FF+local). Furthermore, the performance of the artificial neural network having feedforward connection and LRC (FF+LRC) may be broadly similar to the performance of the fully connected artificial neural network (FC). Meanwhile, the number of the connections in the artificial neural network having feedforward connection and LRC (FF+LRC) may be remarkably less than the number of the connections in the fully connected artificial neural network (FC).

Figure 7A:
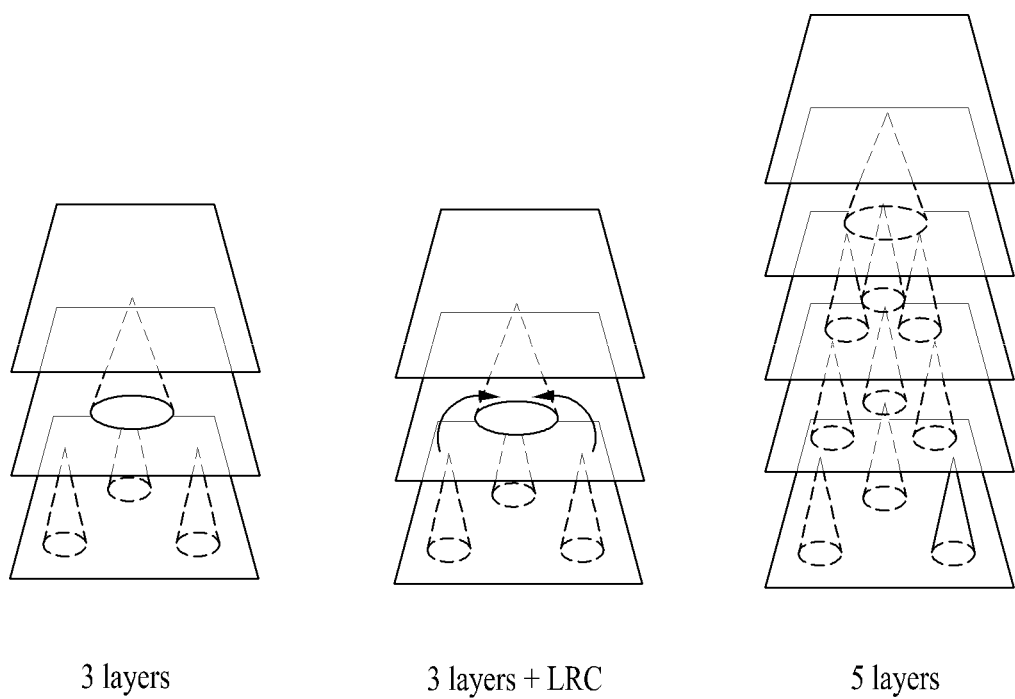
Figure 7B:
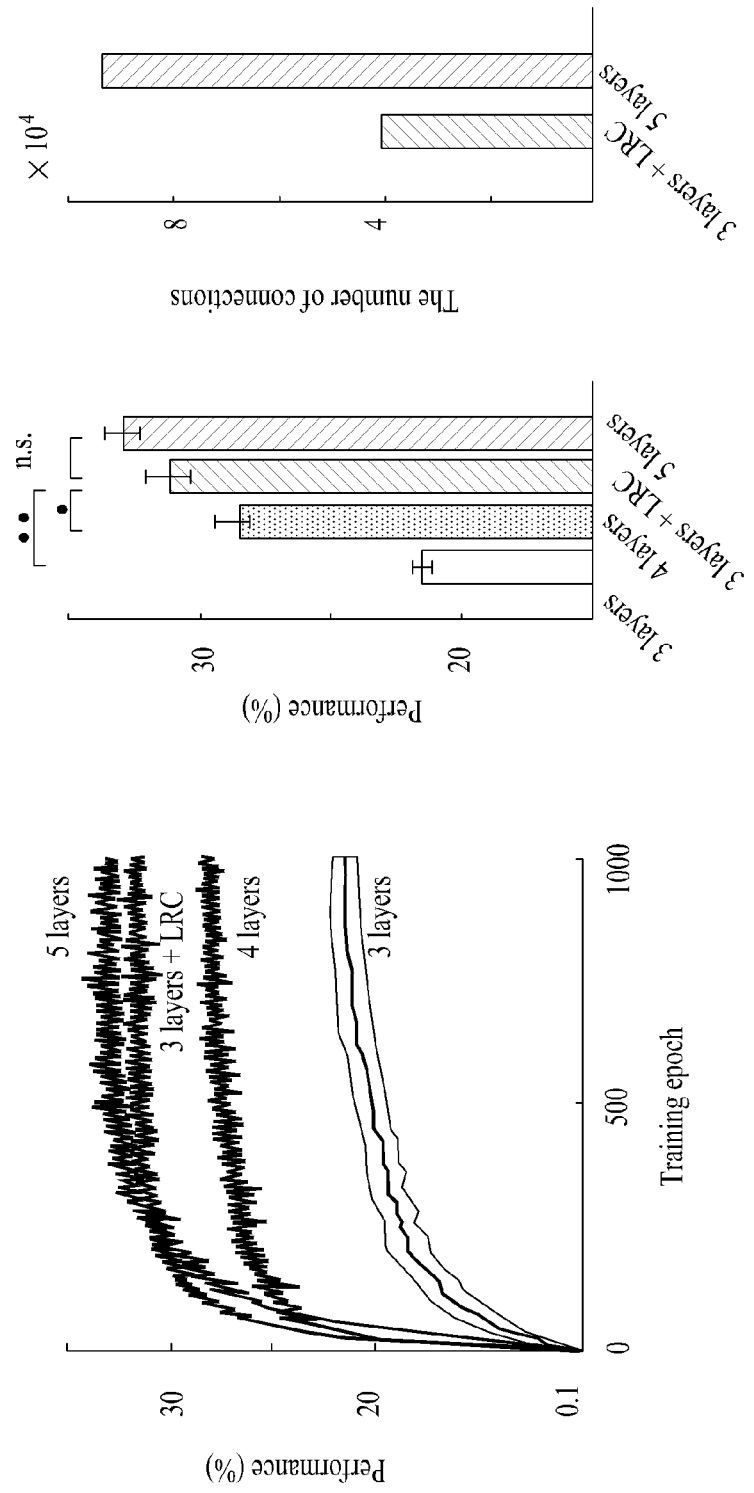

Referring to FIGS. 7A and 7B, performance of an artificial neural network composed of three layers (3 layers), an artificial neural network composed of three layers and having LRC (3 layers+LRC), an artificial neural network composed of four layers (4 layers), and an artificial neural network composed of five layers (5 layers) may be compared. The performance of the artificial neural network composed of three layers and having LRC (3 layers+LRC) may be superior to the performance of the artificial neural network composed of four layers (4 layers) as well as the performance of the artificial neural network composed of three layers (3 layers). Furthermore, the performance of the artificial neural network composed of three layers and having LRC (3 layers+LRC) may be broadly similar to the performance of the artificial neural network composed of five layers (5 layers). Meanwhile, the number of the connections in the artificial neural network composed of three layers and having LRC (3 layers+LRC) may be remarkably less than the number of the connections in the artificial neural network composed of five layers (5 layers).

According to various example embodiments, the artificial neural network 200 may operate resource-efficiently compared to performance by including the LRC 420 with the local connection 430. In other words, the artificial neural network 200 may secure good performance with a small number of connections. Furthermore, the artificial neural network 200 may secure good performance with a small number of layers. Through this, the artificial neural network 200 may maintain the object recognition performance in the image i at a desirable level with little resources.

Figure 8:
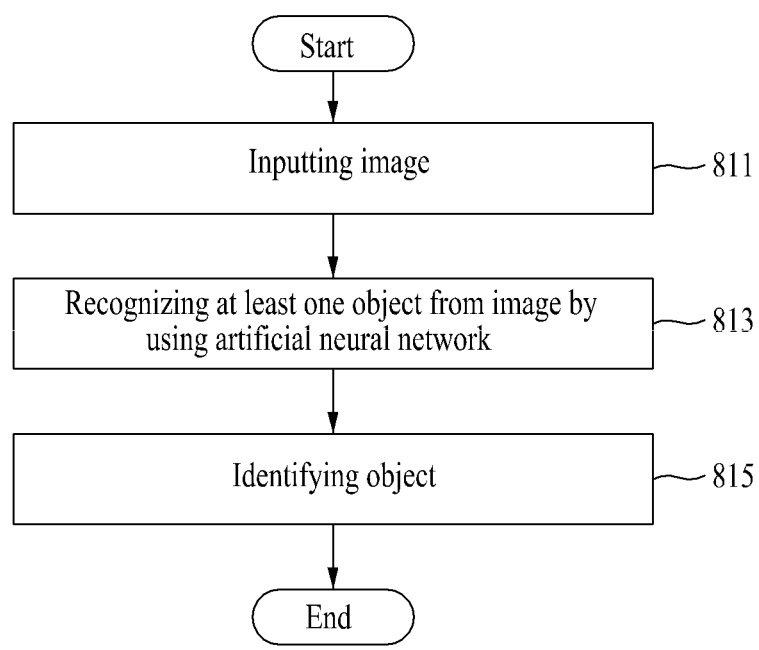
FIG. 8 is a drawing illustrating an operating method of an electronic device according to various example embodiments.

FIG. 8 is a drawing illustrating an operating method of the electronic device 100 according to various example embodiments.

Referring to FIG. 8, the electronic device 100 may input the image i in Operation 811. At this time, the processor 140 may detect the input image i. According to one example embodiment, the processor 140 may detect the image i input through the input module 110. For example, the processor 140 may detect the image i input from the camera device by photographing an external image through the camera device. As another example, the processor 140 may detect the image i input from the communication module by receiving the image i from an external device through the communication module. According to another example embodiment, the processor 140 may detect the image i input from the memory 130 by reading the image i from the memory 130.

The electronic device 100 may recognize at least one object from the image i by using the artificial neural network 200 in Operation 813. At this time, the processor 140 may recognize at least one object from the image i by using the artificial neural network 200. The artificial neural network 200 may include the input layer 310, the at least one hidden layer 320, and the output layer 330, as shown in FIG. 3. The input layer 310 may input the image i to the hidden layer 320. Here, the image i may include at least one object, e.g., the cat. After this, the hidden layer 320 may recognize the object from the image i. At this time, the hidden layer 320 may include the plurality of neurons 410 and the plurality of horizontal connections 420, 430, as shown in FIG. 4. The neurons 410 may process information for the image i. The horizontal connections 420, 430 may connect the neurons 410 in the hidden layer 320. Also, the horizontal connections 420, 430 may include at least one long-range horizontal connection (LRC) 420 and at least one local connection 430. Each LRC 420 may connect any two of the neurons 410 with a length exceeding a preset distance. Each local connection 430 may connect any two of the neurons 410 with a length below a preset distance. The number of the LRC 420 and the number of the local connection 430 may be determined with a preset ratio. In other words, for the total number of the LRC 420 and the local connection 430, the number of the LRC 420 and the number of the local connection 430 may be determined with a preset ratio. According to one example embodiments, a ratio for the LRC 420 may be set in order that the artificial neural network 200 may be implemented as a small world network based on the clustering coefficient C and the average path length L on the hidden layer 320.

The electronic device 100 may identify the object in Operation 815. At this time, the processor 140 may identify the object through the artificial neural network 200. The output layer 330 may identify the object of the image i from the hidden layer 320. Based on this, the processor 140 may identify the object through the output layer 330.

The electronic device 100 according to various example embodiments, may include the memory 130, and the processor 140 connected with the memory 130, configured to execute at least one instruction stored in the memory 130, and having the artificial neural network 200 for recognizing at least one object.

According to various example embodiments, the artificial neural network 200 may be configured to recognize the object from the image i, be composed of the plurality of neurons 410, and include at least one hidden layer 320 including the at least one long-range horizontal connection (LRC) 420 connecting any two of the neurons 410 with a length exceeding a preset distance.

According to various example embodiments, the hidden layer 320 may further include the at least one local connection 430 connecting any two of the neurons 410 with a length below a preset distance.

According to various example embodiments, the number of at least one LRC 420 may be determined with a preset ratio for the total number of the at least one LRC 420 and the at least one local connection 430.

According to various example embodiments, the ratio for the at least one LRC 420 may be determined in order that the artificial neural network 200 is implemented as a small world network based on the clustering coefficient C of the neurons 410 on the hidden layer 320 and the average path length L between the neurons of the artificial neural network 200.

According to various example embodiments, the artificial neural network 200 may further include the input layer 310 configured to input the image i to the hidden layer 320, and the output layer 330 configured to identify the object from the hidden layer 320.

The operating method of the electronic device 100 according to various example embodiments may include inputting the image i, recognizing at least one object from the image i, and identifying the object.

According to various example embodiments, the artificial neural network 200 may be configured to recognize the object from the image i, be composed of the plurality of neurons 410, and include the at least one hidden layer 320 including the at least one LRC 420 connecting any two of the neurons 410 with a length exceeding a preset distance.

According to various example embodiments, the hidden layer 320 may further include the at least one local connection 430 connecting any two of the neurons 410 with a length below a preset distance.

According to various example embodiments, the number of the at least one LRC 420 may be determined with a preset ratio for the total number of the at least one LRC 420 and the at least one local connection 430.

According to various example embodiments, the ratio for the at least one LRC 420 may be determined in order that the artificial neural network 200 is implemented as a small world network based on the clustering coefficient C of the neurons 410 on the hidden layer 320 and the average path length L between the neurons 410 of the artificial neural network 200.

According to various example embodiments, the artificial neural network 200 of the electronic device 100 may operate resource-efficiently compared to performance by using the LRCs 420. At this time, the artificial neural network 200 may secure good performance with a small number of connections. Furthermore, the artificial neural network 200 may secure good performance with a small number of layers. Through this, the artificial neural network 200 may maintain the object recognition performance in the image i at a desirable level with little resources. In other words, amount of calculation and energy consumption required in recognizing the object from the image i in the artificial neural network 200 may be remarkably reduced. Therefore, the artificial neural network 200 may operate similar to an animal's visual cortex structure, and recognize the object from the image i.

The various example embodiments of this disclosure may be implemented as a computer program including at least one instruction stored in a readable storage medium (e.g. the memory 130) by a computer device (e.g., the electronic device 100). For example, a processor (e.g., the processor 140) of the computer device may call at least one of the stored at least one instruction from the storage medium, and execute it. This enables the computer device to be operated to perform at least one function according to the called at least one instruction. The at least one instruction may include a cord generated by a compiler or a cord which may be executed by an interpreter. The computer-readable storage medium may be provided in the form of a non-transitory storage medium. Here, 'non-transitory' only means that the storage medium is a tangible device and does not include a signal (e.g., electromagnetic wave), and this term does not distinguish between the cases that data is stored semi-permanently on the storage medium and data is stored temporarily on the storage medium.

A computer program according to various example embodiments may execute inputting the image i, recognizing at least one object from the image i by using the artificial neural network 200, and identifying the object.

According to various example embodiments, the artificial neural network 200 may be configured to recognize the object from the image i, be composed of the plurality of neurons 410, and include the at least one hidden layer 320 including the at least one LRC 420 connecting any two of the neurons 410 with a length exceeding a preset distance.

According to various example embodiments, the hidden layer 320 may further include the at least one local connection 430 connecting any two of the neurons 410 with a length below a preset distance.

According to various example embodiments, the number of the at least one LRC 420 may be determined with a preset ratio for the total number of the at least one LRC 420 and the at least one local connections 430.

According to various example embodiments, the ratio for the at least one LRC 420 may be determined in order that the artificial neural network 200 is implemented as a small world network based on the clustering coefficient C of the neurons 410 on the hidden layer 320 and the average path length L between the neurons 410 of the artificial neural network 200.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in the importance or the order. It is to be understood that if an element (e.g., a first element) is referred to as "coupled to (functionally or communicatively)" or "connected to" another element (e.g., a second element), it means that the element may be coupled with the other element directly, or via the other element (e.g., a third element).

The term "module" used in the disclosure may include a unit implemented in hardware, software, or firmware and may be interchangeably used with the terms logic, logical block, part, or circuit. The unit may be a minimum unit of an integrated part or may be a part thereof. The module may be a minimum unit for performing one or more functions or a part thereof. For example, the module may include an application-specific integrated circuit (ASIC).

According to various embodiments, each component (e.g., the module or the program) of the above-described components may include one or plural entities. According to various embodiments, at least one of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

What is claimed is:

1. An electronic device, comprising:
   a memory; and
   a processor connected with the memory, configured to execute at least one instruction stored in the memory, and having an artificial neural network for recognizing at least one object from an image,
   wherein the artificial neural network is configured to recognize the object from the image, is composed of a plurality of neurons, and comprises at least one hidden layer comprising at least one long-range horizontal connection connecting any two of the neurons with a length exceeding a preset distance,
   wherein the hidden layer further comprises at least one local connection connecting any two of the neurons with a length below a preset distance,
   wherein the number of the at least one long-range horizontal connection is determined by a preset ratio for the total number of the at least one long-range horizontal connection and the at least one local connection.

2. The device of claim 1, wherein the ratio is determined in order that the artificial neural network is implemented as a small world network, based on a clustering coefficient of the neurons on the hidden layer and an average path length between the neurons of the artificial neural network.

3. The device of claim 2, wherein the artificial neural network further comprises:
   an input layer configured to input the image to the hidden layer; and
   an output layer configured to identify the object from the hidden layer.

4. The device of claim 3, wherein the clustering coefficient is defined as the following equation:

$$C = \log\left(\frac{1}{N_{hidden} \sum_j c_j}\right)$$

where the $N_{hidden}$ indicates the number of the neurons on the hidden layer, and the $c_j$ indicates the local clustering coefficient of j-th neuron on the hidden layer and is defined as the following equation:

$$c_j = \frac{1}{N_{neighbor,j}}\left(\sum_i \frac{1}{d_{ii'}} + \sum_j \frac{1}{d_{j'j''}}\right)$$

where the $N_{neighbor,j}$ indicates the number of neurons connected with j-th neuron of the hidden layer, the $d_{ii'}$ indicates distance between i-th neuron and i'-th neuron on the input layer, and the $d_{jj'}$ indicates distance between j-th neuron 410 and j'-th neuron on the hidden layer.

5. The device of claim 4, wherein the average path length is defined as the following equation:

$$L = \frac{1}{N_{input}(N_{input} - 1)}\sum_{i \neq i'} l_{ii'}$$

where $N_{input}$ indicates the number of neurons on the input layer, and the $l_{ii'}$ indicates the shortest path between i-th neuron and i'-th neuron on the input layer.

6. The device of claim 5, wherein the small world network is defined as the following equation:

$$SW = \frac{C - C_{rand}}{C_{regular} - C_{rand}} \times \frac{L_{regular} - L_{rand}}{L - L_{rand}}$$

where the $C_{rand}$ and the $L_{rand}$ indicate the clustering coefficient and the average path length of the artificial neural network having randomly connected horizontal connection, and the $C_{regular}$ and the $L_{regular}$ indicate the clustering coefficient and the average path length of the artificial neural network having only feedforward connection.

7. An operating method of an electronic device, comprising:
   inputting an image;
   recognizing at least one object from the image by using an artificial neural network; and
   identifying the object,
   wherein the artificial neural network is configured to recognize the object from the image, is composed of a plurality of neurons, and comprises at least one hidden layer comprising at least one long-range horizontal connection connecting any two of the neurons with a length exceeding a preset distance,
   wherein the hidden layer further comprises at least one local connection connecting any two of the neurons with a length below a preset distance,
   wherein the number of the at least one long-range horizontal connection is determined by a preset ratio for the total number of the at least one long-range horizontal connection and the at least one local connection.

8. The method of claim 7, wherein the ratio is determined in order that the artificial neural network is implemented as a small world network, based on a clustering coefficient of the neurons on the hidden layer and an average path length between the neurons of the artificial neural network.

9. The method of claim 8, wherein the artificial neural network further comprises:
   an input layer configured to input the image to the hidden layer; and
   an output layer configured to identify the object from the hidden layer.

10. The method of claim 9, wherein the clustering coefficient is defined as the following equation:

$$C = \log\left(\frac{1}{N_{hidden} \sum_j c_j}\right)$$

where the $N_{hidden}$ indicates the number of the neurons on the hidden layer, and the $c_j$ indicates the local clustering coefficient of j-th neuron on the hidden layer and is defined as the following equation:

$$c_j = \frac{1}{N_{neighbor,j}} \left( \sum_i \frac{1}{d_{ii'}} + \sum_j \frac{1}{d_{j'j''}} \right)$$

where the $N_{neighbor,j}$ indicates the number of neurons connected with j-th neuron of the hidden layer, the $d_{ii'}$ indicates distance between i-th neuron and i'-th neuron on the input layer, and the $d_{jj'}$ indicates distance between j-th neuron 410 and j'-th neuron on the hidden layer.

11. The method of claim 10, wherein the average path length is defined as the following equation:

$$L = \frac{1}{N_{input}(N_{input} - 1)} \sum_{i \neq i'} l_{ii'}$$

where $N_{input}$ indicates the number of neurons on the input layer, and the $l_{ii'}$ indicates the shortest path between i-th neuron and i'-th neuron on the input layer.

12. The method of claim 11, wherein the small world network is defined as the following equation:

$$SW = \frac{C - C_{rand}}{C_{regular} - C_{rand}} \times \frac{L_{regular} - L_{rand}}{L - L_{rand}}$$

where the $C_{rand}$ and the $L_{rand}$ indicate the clustering coefficient and the average path length of the artificial neural network having randomly connected horizontal connection, and the $C_{regular}$ and the $L_{regular}$ indicate the clustering coefficient and the average path length of the artificial neural network having only feedforward connection.

13. A non-transitory computer-readable storage medium storing a computer program, wherein the computer program comprises:
    inputting an image;
    recognizing at least one object from the image by using an artificial neural network; and
    identifying the object, and
    wherein the artificial neural network is configured to recognize the object from the image, is composed of a plurality of neurons, and comprises at least one hidden layer comprising at least one long-range horizontal connection connecting any two of the neurons with a length exceeding a preset distance,
    wherein the hidden layer further comprises at least one local connection connecting any two of the neurons with a length below a preset distance,
    wherein the number of the at least one long-range horizontal connection is determined by a preset ratio for the total number of the at least one long-range horizontal connection and the at least one local connections.

14. The non-transitory computer-readable storage medium of claim 13, wherein the ratio is determined in order that the artificial neural network is implemented as a small world network, based on a clustering coefficient of the neurons on the hidden layer and an average path length between the neurons of the artificial neural network.

* * * * *